US012585685B2

(12) United States Patent
Nair et al.

(10) Patent No.: US 12,585,685 B2
(45) Date of Patent: Mar. 24, 2026

(54) EVIDENCE RETRIEVAL FOR LONG DOCUMENT QUESTION ANSWERING USING LARGE LANGUAGE MODELS

(71) Applicant: Adobe Inc., San Jose, CA (US)

(72) Inventors: Inderjeet Nair, Ann Arbor, MI (US); Shwetha S, Bangaluru (IN); Apoorv Saxena, Bangaluru (IN); Koustava Goswami, Bangaluru (IN)

(73) Assignee: Adobe Inc., San Jose, CA (US)

( * ) Notice: Subject to any disclaimer, the term of this patent is extended or adjusted under 35 U.S.C. 154(b) by 142 days.

(21) Appl. No.: 18/508,437

(22) Filed: Nov. 14, 2023

(65) Prior Publication Data

US 2025/0156465 A1 May 15, 2025

(51) Int. Cl.
  *G06F 16/34* (2025.01)
  *G06F 40/284* (2020.01)
  *G06F 40/40* (2020.01)
(52) U.S. Cl.
  CPC .......... *G06F 16/345* (2019.01); *G06F 40/284* (2020.01); *G06F 40/40* (2020.01)
(58) Field of Classification Search
  None
  See application file for complete search history.

(56) References Cited

U.S. PATENT DOCUMENTS

2024/0419695 A1* 12/2024 Matson ................... G06F 40/40

OTHER PUBLICATIONS

Ainslie et al., "ETC: Encoding Long and Structured Inputs in Transformers", Proceedings of the 2020 Conference on Empirical Methods in Natural Language Processing, Nov. 16-20, 2020, pp. 268-284.

Cao et al., "HIBRIDS: Attention with Hierarchical Biases for Structure-aware Long Document Summarization", Proceedings of the 60th Annual Meeting of the Association for Computational Linguistics, May 22-27, 2022, pp. 786-807.

Dasigi et al., "A Dataset of Information-Seeking Questions and Answers Anchored in Research Papers", arXiv:2105.03011v1, May 7, 2021, 12 pages.

Github, "Langchain-ai/ langchain", available online at <https://github.com/langchain-al/langchain>, 2024, 9 pages.

Gong et al., "Recurrent Chunking Mechanisms for Long-Text Machine Reading Comprehension", Proceedings of the 58th Annual Meeting of the Association for Computational Linguistics, Jul. 5-10, 2020, pp. 6751-6761.

Guthrie et al., "Roles of Document Structure, Cognitive Strategy, and Awareness in Searching for Information," Reading Research Quarterly, vol. 26, No. 3, Summer 1991, pp. 300-324.

(Continued)

*Primary Examiner* — Aneeta Yodichkas
(74) *Attorney, Agent, or Firm* — Nicholson De Vos Webster & Elliott LLP

(57) ABSTRACT

Embodiments are disclosed for long document question answering using large language models. The method may include receiving a question for a document. A representation of the document may then be obtained. A large language model (LLM) is used to identify one or more sections of the document that are relevant to the question using the representation of the document. A document question answering model determines an answer to the question using the one or more sections of the document.

20 Claims, 8 Drawing Sheets

(56) References Cited

OTHER PUBLICATIONS

Lewis et al., "BART: Denoising Sequence-to-Sequence Pre-training for Natural Language Generation, Translation, and Comprehension", Proceedings of the 58th Annual Meeting of the Association for Computational Linguistics, Jul. 5-10, 2020, pp. 7871-7880.

Meyer et al., "Use of Top-Level Structure in Text: Key for Reading Comprehension of Ninth-Grade Students," Reading Research Quarterly, vol. 16, No. 1, 1980, pp. 72-103.

Nair et al., "A Neural CRF-based Hierarchical Approach for Linear Text Segmentation", Association for Computational Linguistics, May 2-6, 2023, pp. 883-893.

Nie et al., "Capturing Global Structural Information in Long Document Question Answering with Compressive Graph Selector Network", Proceedings of the 2022 Conference on Empirical Methods in Natural Language Processing, Dec. 7-11, 2022, pp. 5036-5047.

Nogueira et al., "Document Ranking with a Pretrained Sequence-to-Sequence Model", Association for Computational Linguistics, Nov. 16-20, 2020, pp. 708-718.

Wei et al., "Chain-of-Thought Prompting Elicits Reasoning in Large Language Models", arXiv:2201.11903v6, Jan. 10, 2023, pp. 1-43.

Yang et al., "HOTPOTQA: A Dataset for Diverse, Explainable Multi-hop Question Answering", Proceedings of the 2018 Conference on Empirical Methods in Natural Language Processing, Oct. 31-Nov. 4, 2018, pp. 2369-2380.

Yao et al., "React: Synergizing Reasoning and Acting in Language Models", ICLR, Mar. 10, 2023, 33 pages.

Zheng et al., "Document Modeling with Graph Attention Networks for Multi-grained Machine Reading Comprehension", Proceedings of the 58th Annual Meeting of the Association for Computational Linguistics, Jul. 5-10, 2020, pp. 6708-6718.

* cited by examiner

700

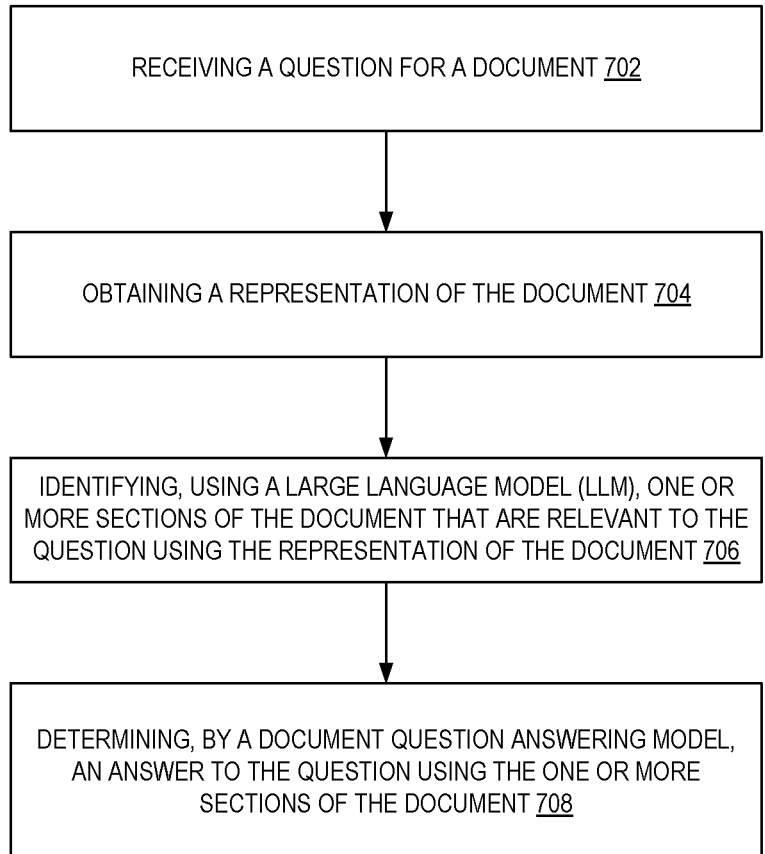

RECEIVING A QUESTION FOR A DOCUMENT 702

OBTAINING A REPRESENTATION OF THE DOCUMENT 704

IDENTIFYING, USING A LARGE LANGUAGE MODEL (LLM), ONE OR MORE SECTIONS OF THE DOCUMENT THAT ARE RELEVANT TO THE QUESTION USING THE REPRESENTATION OF THE DOCUMENT 706

DETERMINING, BY A DOCUMENT QUESTION ANSWERING MODEL, AN ANSWER TO THE QUESTION USING THE ONE OR MORE SECTIONS OF THE DOCUMENT 708

*FIG. 7*

EVIDENCE RETRIEVAL FOR LONG DOCUMENT QUESTION ANSWERING USING LARGE LANGUAGE MODELS

BACKGROUND

Document Question Answering (DQA) is a machine learning task in which a user asks a natural language question about a document and receives a natural language answer. Typically, a user may provide the document and the question to a DQA model which then processes the question and the document to determine the answer. Many systems use a Pretrained Language Model (PLM) as the DQA model. The PLM may be fine-tuned for the DQA task or for specific documents. In addition to standard DQA, other related document question answering tasks also exist. For example, one variation of DQA is Long Document Question Answering (LDQA). LDQA is a complex task that involves locating relevant evidence from lengthy documents to provide accurate answers to specific questions.

SUMMARY

Introduced here are techniques/technologies that enable long document question answering using large language models for evidence retrieval. In particular, one or more embodiments use LLMs to identify the relevant text needed from a long document to answer a question provided by a user. In some embodiments, relevant portions of the document may be identified using a coarse grain processing stage and a fine grain processing stage. In the coarse grain processing stage, a document representation, such as an outline, is used to identify relevant sections from the document. By using a summary of the document, relevant sections may be identified in the context of the entire document, making the predictions more accurate.

Once the relevant sections have been identified, a fine grain processing stage can identify specific paragraphs from the relevant sections that are relevant for answering the question. The text of the relevant paragraphs can then be provided to a document question answering model to generate a natural language text answer to be returned to the user. This allows for the DQA model to process significantly less text than the entire long document, saving processing resources, without a loss of accuracy.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates a flowchart of a series of acts in a method of long document question answering in accordance with one or more embodiments.

DETAILED DESCRIPTION

Figure 1:
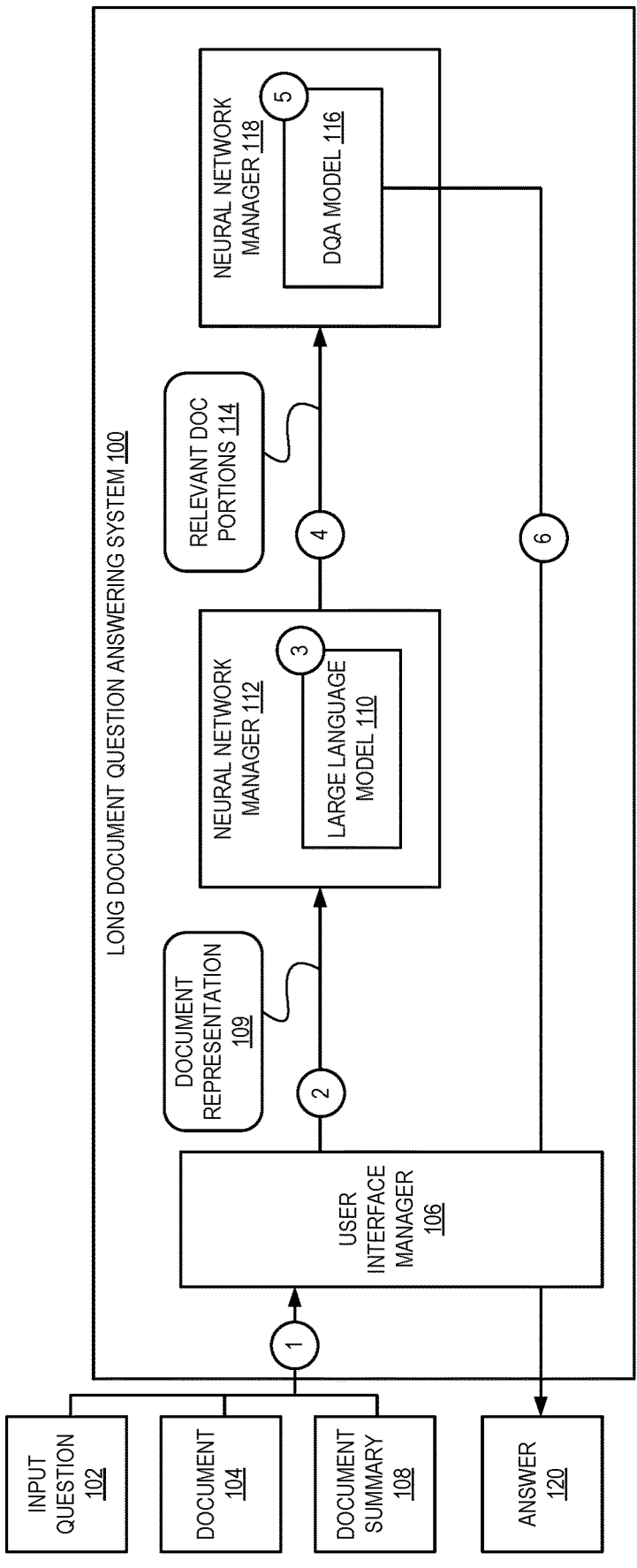
FIG. 1 illustrates a diagram of a process of long document question answering in accordance with one or more embodiments.

One or more embodiments of the present disclosure include a long document question answering (LDQA) system which provides efficient evidence retrieval for long document question answering. Evidence retrieval for long document question answering involves locating relevant portions of a document or set of documents to answer a question. Prior approaches use pretrained language models for LDQA. This involves processing the document by the pretrained language model to extract relevant information needed to answer the question. However, long documents often exceed the maximum token limit of existing transformer-based pretrained language models (e.g., 512 or 1024 tokens). This has led to a number of approaches that attempt to make LDQA work with existing systems.

One approach to LDQA addresses the limits of existing models by processing the entire document in chunks. However, this piece-wise processing is time consuming and expensive. Moreover, it does not provide the LDQA system with an overall view of the document. This makes processing the content of the documents to extract pertinent information a challenge by itself. Additionally, the information required to answer a question is often dispersed across different sections or paragraphs within the document which may require sophisticated reasoning to identify and extract the relevant information.

Another popular approach for LDQA is the retrieve-then-read method. This approach recognizes that processing the entire document to find answers can be computationally expensive and inefficient. Instead of processing the entire document, relevant paragraphs are retrieved from a document to provide the answer. However, this relies on a robust ability to select relevant portions of the document accurately. A major drawback of existing retrieve-then-read techniques is reliance on supervised fine-tuning for the evidence selection phase, which exhibits poor generalization on out-of-distribution data.

Large language models (LLMs) have demonstrated remarkable few-shot/zero-shot performance and enhanced generalization capabilities across various natural language generation and understanding tasks. However, LLMs, which are based on transformer architecture, are limited by their context length and suffer from expensive inference times that increase quadratically with the number of tokens in the input. Additionally, utilizing enterprise LLM solutions to process an entire long document may additionally incur significant monetary costs.

To address these and other deficiencies in conventional systems, the LDQA system of the present disclosure uses large language models (LLMs) in the task of zero-shot long document evidence retrieval. In particular, embodiments achieve faster and more cost-effective inference by selectively processing relevant portions of the document, without compromising downstream performance. To do so, embodiments use a document structure (also referred to as "structure") associated with long documents. For example, long documents may include tables of contents, headings, and section summaries, and/or other structures that encompass the organization of topics, semantic segments, and information flow, enabling effective information search and knowledge acquisition for question answering.

In some embodiments, a representation of the long document may be generated using the document structure by replacing the content of the document within each section with a corresponding summary. This condensed representation (or just "representation"), can then be provided to the LLM. This allows for efficient processing of tokens while allowing the model to comprehensively analyze the entire input context to identify relevant sections. Once the relevant sections have been identified by the LLM using the document representation, the actual content from the long document corresponding to those sections can then be processed for fine-grained evidence retrieval. This fine-grained processing may be performed by the same or a different LLM.

The fine-grained evidence retrieval process identifies specific portions (e.g., paragraphs, sentences, etc.) of the long document that are likely relevant for evidence retrieval. These sections may then be provided to a long document question answering (LDQA) model, allowing the LDQA model to quickly and efficiently process only the relevant portions of the long document to answer the question.

By using an LLM to determine the relevant sections of the document, the total amount of text being processed is reduced to only the relevant sections. This maintains DQA state of the art performance while greatly reducing the quantity of text to be processed in long documents. Additionally, by processing a representation of the entire document, the LLM evaluates relevancy based on a holistic view of the document. This allows the LLM to more accurately predict which sections of the long document are relevant, which ultimately produces more accurate answers.

FIG. 1 illustrates a diagram of a process of long document question answering in accordance with one or more embodiments. As shown in FIG. 1, embodiments include a long document question answering (LDQA) system 100 which receives a natural language text question about a document and identifies an answer to the question in the document. In some embodiments, the LDQA system 100 may be implemented as part of a document viewing and/or editing system. For example, a user may view a document in a document viewing system and interact with the document viewing system to access the LDQA system 100. For example, the user may select a tool, menu element, icon, or other user interface element within the document viewing system to access the LDQA system. The user may then enter a natural language question (e.g., into a text box or via other user input). The LDQA system can then process the question and the document and return a natural language answer via the document viewer. Alternatively, the LDQA system 100 may be implemented as a standalone application or system which can be accessed by a user, application, system, or other entity to provide an answer to a question about a document.

In the example of FIG. 1, the LDQA system 100 may obtain an input question 102 and a document 104, at numeral 1. As noted above, the input question 102, the document 104, and a document summary 108 may be provided directly by a user, indirectly from a user interacting with another system such as a document viewer, etc. For example, the user may interact with user interface manager 106 to provide the document and question. The user interface manager 106 may present a user interface element, such as a text box, through which the user may enter a natural language question. As discussed, the input question 102 may be a natural language question provided as text data. The document may be a text document, multimedia document, or other document which includes text content. The LDQA system can process long documents or short documents. As discussed, most conventional transformer-based models often have token limits of 512-1024 tokens. In some embodiments, long documents may refer to documents that exceed these limits.

Longer documents are often associated with inherent structure (e.g., headings, section summaries, outlines, etc.). In some embodiments, this inherent structure may be extracted from the document 104 or provided as a separate document by the user or other system, such as document summary 108. In the example of FIG. 1, the document summary 108 may include sections (or other structure) corresponding to the structure of document 104, along with corresponding summaries of the document text (e.g., "section summaries"). In some embodiments, the document representation 109 may be the summary 108 itself. Alternatively, the document representation 109 may be generated from the document 104. In such instances, the document representation 109 includes a plurality of sections corresponding to the sections of the input document 104, where each section text of the document 104 has been replaced with a text summary of that section. The document representation 109 may be provided to LLM 110 at numeral 2.

At numeral 3, large language model (LLM) 110 processes the document representation 109 along with a prompt asking the LLM 110 to identify sections of the document representation 109 that are relevant to answering the input question 102. Large language models are a type of language model that can perform a number of natural language-based tasks. LLMs are notable for their few-shot/zero-shot performance and generalization capabilities across a variety of natural language generation and understanding tasks. LLMs may include one or more neural networks, often based on transformer architectures.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As shown in FIG. 1, the LLM 110 may be hosted by a neural network manager 112. The neural network manager 112 may host one or more neural networks and may include any hardware or software resources needed to facilitate execution of its associated neural network(s). As discussed further below, in some embodiments, LDQA system 100 may include one or more LLMs to facilitate a coarse-grained process, in which relevant sections of the document 104 are identified, and a fine-grained process, in which specific paragraphs/sentences/etc. are identified. At numeral 4, the text corresponding to these relevant document portions 114 are provided to a document question answering (DQA) model 116. As shown in FIG. 1, the DQA model 116 is hosted in a separate neural network manager 118. In some embodiments, the DQA model and LLM may be hosted in the same neural network manager or spread across multiple neural network managers, depending on security, performance, or other requirements.

A DQA model may be a pretrained language model that has been trained specifically to answer natural language questions about a target text. A DQA model 116 can receive the relevant document portions 114 and a prompt which requests an answer to the input question 102, based on the relevant document portions. At numeral 5, the DQA processes the relevant document portions 114 and the prompt and generates an answer 120 to the input question 102. At numeral 6, the answer 120 may then be returned to the user. The resulting answer 120 is obtained based on processing only the relevant portions of the input document 104, which is typically significantly less text than the entire input document 104, without a loss of accuracy.

Figure 2:
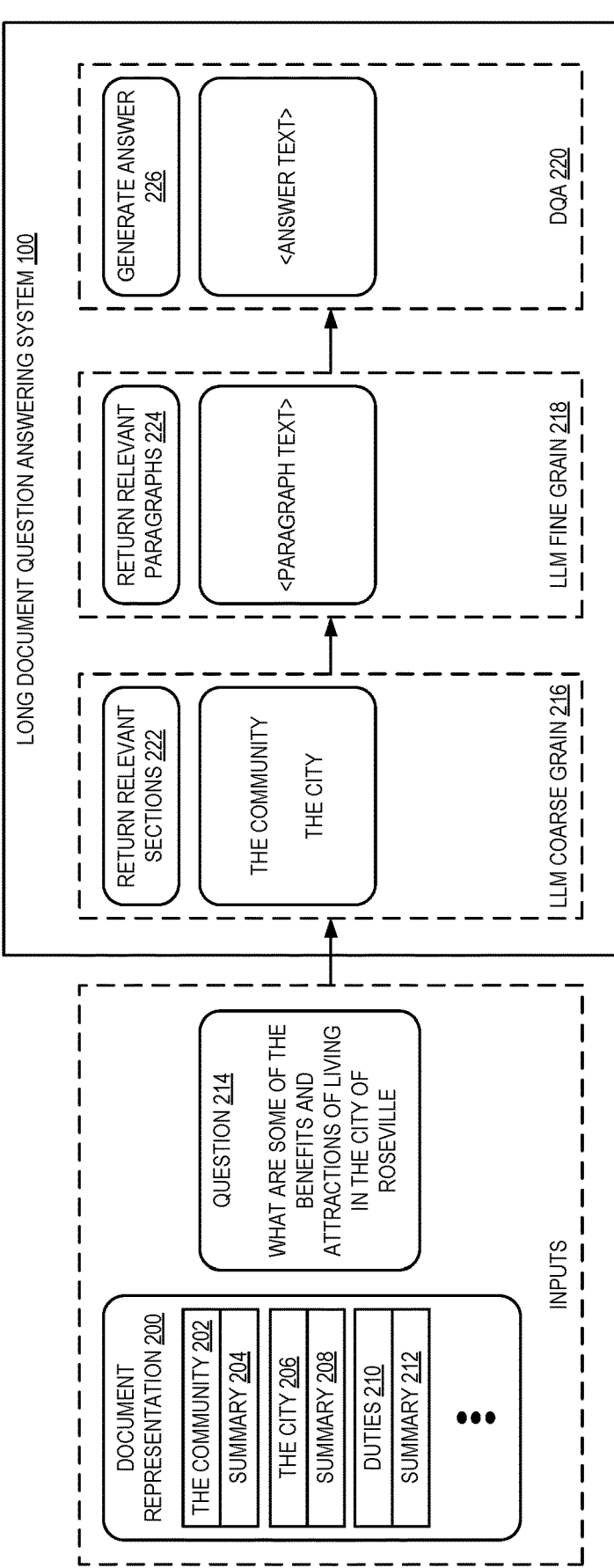
FIG. 2 illustrates an example of long document question answering using large language models in accordance with one or more embodiments.

FIG. 2 illustrates an example of long document question answering using large language models in accordance with one or more embodiments. As shown in the example of FIG. 2, a user can provide inputs to the LDQA system 100. The inputs may include a document representation 200 corresponding to a long document and a question 214. As discussed, the document representation 200 may be provided as a separate input, extracted from a long document provided as an input, and/or generated based on the long document provided as an input. As shown, the document representation 200 may include a number of section headings (e.g., The Community 202, The City 206, Duties 210, etc.) and corresponding text summaries (e.g., Summary 204, 206, and 212). In this instance, the document includes facts about the city of Roseville. The question 214 can be answered based on the document and is "What are some of the benefits and attractions of living in the city of Roseville."

The first step of LDQA using LLMs is an LLM coarse-grain evaluation. The coarse-grain LLM processes the document representation 200 and a prompt based on the question to identify sections of the document that are relevant to answering this question. In this instance, the sections "The Community" and "The City" are identified as relevant sections 222. Using the relevant sections, processing may then proceed to the fine-grain LLM 218. The fine-grain LLM can process the document text corresponding to the relevant sections 222. For example, each section of the document representation 200 may map back to a corresponding section of the original input document. The document text from the document, corresponding to the relevant sections, can be obtained from the document, and provided to the fine-grain LLM. A new fine-grain prompt is generated and the fine-grain LLM processes the relevant document text to identify relevant paragraphs 224. As shown, the relevant paragraph text is then provided to the DQA model 220. The DQA model can process the relevant paragraph text, rather than the entire document or entire section(s), to generate an answer 226 to the question 214.

The example of FIG. 2 shows a separate coarse-grain and fine-grain LLM processing stages. In some embodiments, each processing stage may be associated with its own LLM (e.g., a fine-grain LLM and a coarse-grain LLM), each tuned for its respective task. Alternatively, in some embodiments, a single LLM may be used for both fine-grain and coarse-grain processing. Additionally, in the example of FIG. 2, the fine-grain processing stage returns relevant paragraph text. In some embodiments, the relevant portion of text may be finer (e.g., at the sentence, clause, or word levels) or may include a coarser block of text (e.g., multiple contiguous or non-contiguous paragraphs).

In some embodiments, the fine-grain processing stage may be selectively invoked. For example, after coarse-grain processing has identified relevant sections of the document, a token check may be performed. This may include determining a total number of tokens in the text of the corresponding relevant sections of the document. If the number of tokens is below a maximum token limit associated with the DQA model 220 (or other token limit imposed by the LDQA system), then the text of the relevant sections may be used to answer the question 214. However, if the total number of tokens exceeds the token limit, then fine-grain processing 218 may be used to identify the relevant paragraphs 224, further reducing the number of tokens needed to be passed to the DQA model 220. For example, if the coarse-grain processing determines only one short section of the input document is relevant to the question then further refinement is not needed. This reduces the total number of inference calls made to the LLM, reducing resource costs. Further, because the DQA model still receives all of the relevant text for answering the question, DQA accuracy is maintained.

Figure 3:
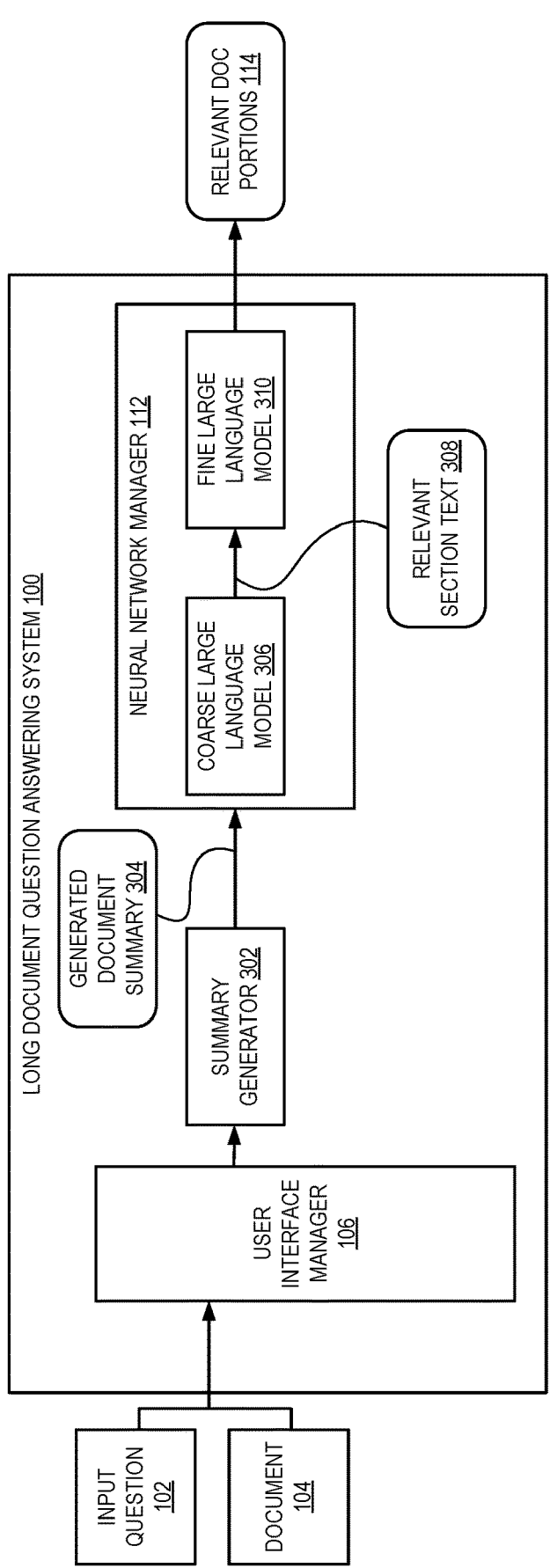
FIG. 3 illustrates an example of generating document representation in a long document question answering system in accordance with one or more embodiments.

FIG. 3 illustrates an example of generating document representation in a long document question answering system in accordance with one or more embodiments. As discussed, a long document may include corresponding inherent structure, such as sections, headings, etc. In the example of FIG. 3, the LDQA system 100 includes a summary generator 302 which generates the document summary used by the LLM(s) to identify relevant portions of the document 104.

The summary generator may a include neural network trained to generate a summary of an input text. The summary generator 302 can extract the text of each section of the document and generate a summary using the summary generator. The generated document summary 304 can include headings, section titles, or other structure information identifying distinct portions of the document 104 and corresponding summaries generated by the summary generator.

The resulting generated document summary 304 can then be processed by the LLMs, as discussed above. For example, in some embodiments, the generated document summary 304 is first processed by a coarse LLM 306. The coarse LLM 306 processes the generated document summary 304 along with a prompt which instructs the coarse LLM to identify sections that may be relevant to answering the input question. The text corresponding to these sections (e.g., relevant section text 308) can then be passed to fine LLM 310. The fine LLM 310 then identifies the relevant document portions 114 (e.g., paragraphs, sentences, clauses, etc.) of the document 104. As discussed, the same LLM model may be used for both coarse and fine-grain processing. Alternatively, different LLMs may be used for coarse and fine-grain processing as depicted here.

Figure 4:
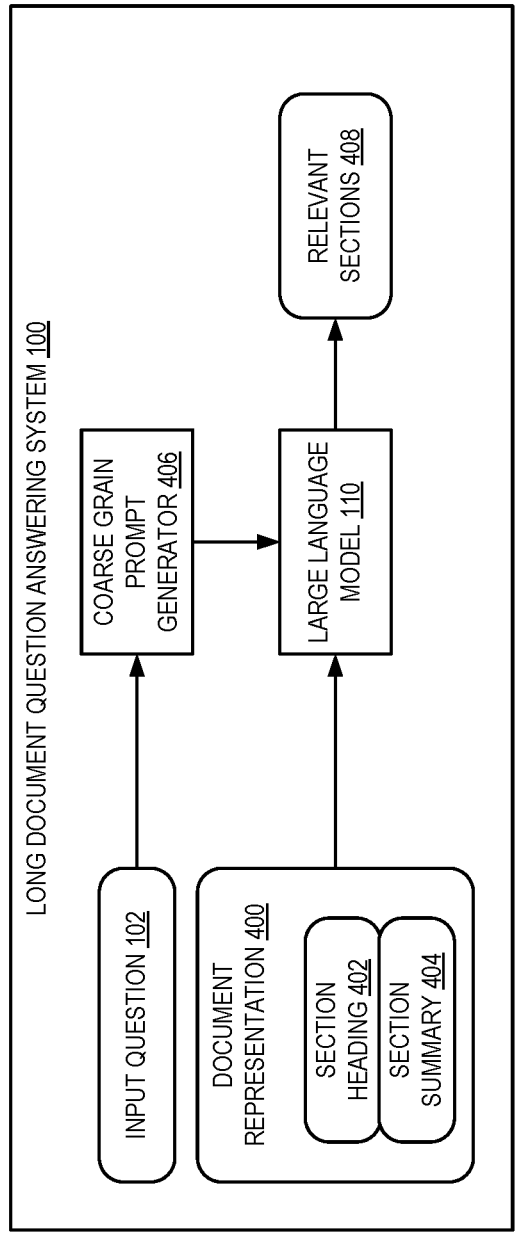
FIGS. 4-5 illustrate an end-to-end pipeline of a long document question answering system in accordance with one or more embodiments.
Figure 5:
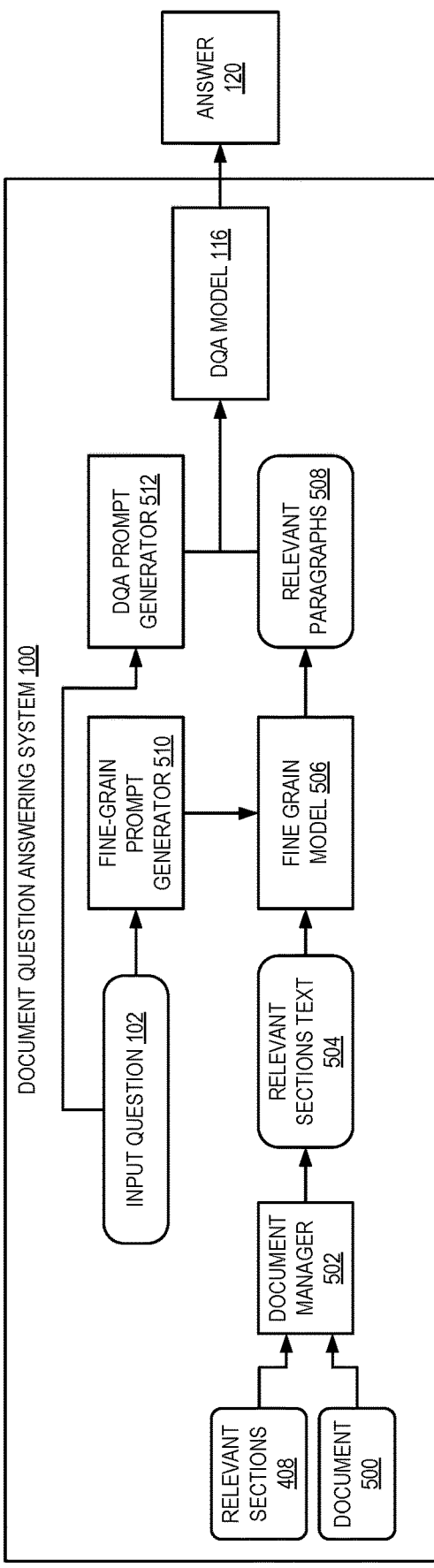

FIGS. 4-5 illustrate an end-to-end pipeline of a long document question answering system in accordance with one or more embodiments. In LDQA, a question q is asked for a document $D=[p_1, p_2, \ldots, p_n]$ where $p_i(1 \le i \le n)$ is the $i^{th}$ paragraph in the natural reading order of D. The task of LDQA is to retrieve a set of relevant paragraphs $E_q \subseteq D$ and generate a free-form answer a based-on q and D. However, as discussed, longer documents often exceed the maximum number of tokens that can be processed by a DQA model. Unlike traditional techniques, which process such long documents in a piece-wise fashion, embodiments utilize LLMs and a representation of D to generate the answer a while processing significantly less text than the entire document.

For example, embodiments may represent $D=[S_1, S_2, \ldots, S_k]$, where $S_i(1 \le i \le k)$ denotes $i^{th}$ section, such that, name (Si) denotes the name/heading of the section and the list of constituent paragraphs respectively (paragraphs $(Si)=[pi, j]_{j=1}^{|Si|}$ where |Si| denotes number of constituent paragraphs). Note that, $\Sigma_{i=1}^{k}|Si|=n$.

In some embodiments, document representation 400 is generated by representing the content in each section $S_i$ by a summary of paragraphs $(S_i)$. Summarization may refer to the task of generating a concise summary for a given input that captures its main idea within a limited number of tokens, effectively conveying its topical essence. The summarization operation is represented herein by $\mathcal{S}$. One option for summarization is using bart-large fine-tuned over CNN/Daily-Mail Corpus. As such, the document representation 400 includes section headings 402 and section summaries 404. This may be represented as:

* Section: name $(S_1)$
$\mathcal{S}$ (paragraphs $(S_1)$)
* Section: name $(S_2)$
$\mathcal{S}$ (paragraphs $(S_2)$)

. . . .

* Section: name $(S_k)$
$\mathcal{S}$ (paragraphs $(S_k)$)

Input question 102 is provided to coarse-grain prompt generator 406. In some embodiments, coarse-grain prompt generator 406 generates a prompt using the input question. This may be a hard-coded prompt that was determined to perform best by the LLM. Alternatively, the prompt generator may be a language model trained to generate a prompt for the LLM based on the content, structure, or other features of the input question 102. For example, the prompt may indicate the document structure and instruct the LLM to return sections that are relevant to the input question. An example prompt is shown below:

Coarse-Grain Prompt

Document section structure: {Section: Section Summary}
Question: {Question}
List all section names that may be relevant for answering the question. Respond with comma-separated section name list. Provide an empty response if none of the sections are relevant The LLM 110 receives the prompt generated by coarse-grain prompt generator 406 and identifies all the sections that are relevant to the question 102. Due to this condensed representation, the LLM 110 can process the entire document context, enabling comprehensive analysis of long-range dependencies for accurate inference. The resulting set of relevant sections 408 can be represented by $R_q \subseteq D$.

Once the relevant sections 408 have been identified in the coarse-grain processing phase, fine-grain processing can be performed, as shown in FIG. 5. The objective of fine-grain processing is to infer a set of relevant paragraphs (or other portions) based on relevant sections $R_q$. Multiple zero-shot strategies may be used for fine-grain processing. In some embodiments, a document manager 502 can use the relevant sections $R_q$ to extract the document text from the input document 500. For example, the document manager 502 may obtain a set of all paragraphs $P_q$ text (e.g., relevant sections text 504) corresponding to $R_q$.

$$P_q = \bigcup_{S \in R_q} \text{paragraphs}\,(S)$$

Thereafter, one of the following strategies can be employed for fine-grained retrieval:

MONOT5: In this example, no additional prompt is needed. Instead, the fine-grain model 506 is the MonoT model. The MonoT model is a sequence-to-sequence model trained over the task of Document Re-ranking. The output of this model is a ranked list of paragraphs from which relevant paragraphs 508 may be selected.

BASE: In this example, each paragraph from $P_q$ is marked with an identifier and then the identifier-annotated paragraphs are concatenated with a newline separator. Fine-grain prompt generator 510 can then generate a prompt, based on the input question, instructing the fine grain model to generate a list of all paragraph identifiers whose corresponding paragraph is relevant to q. In this example, fine grain model 506 may be an LLM (e.g., the same LLM as the coarse-grain LLM, or similar LLM). If the number of paragraphs in $P_q$ exceeds the maximum context length of LLM, it is fragmented contiguously so that each of them fits into the context window.

HIERBASE: In this approach, a two-step process is used to capture the essence of each paragraph. Firstly, paragraphs are represented using their corresponding summaries obtained through $\mathcal{S}$. Following that, the BASE strategy is used to identify potentially relevant candidates. In the next stage, the BASE technique is applied again, this time considering the original content of the paragraphs, to pinpoint the most relevant paragraphs 508.

These approaches may also be chained. One such method, called BASE+MONOT5, combines the BASE strategy with MONOT5. This approach initially identifies a relevant set of paragraphs using the BASE strategy and subsequently employs MONOT5 to refine the selection further, retaining only the most relevant ones from the initially identified set.

In the BASE and HIERBASE strategies, input question 102 is provided to fine-grain prompt generator 510 to generate a prompt using the input question. As in the coarse-grain prompt, this may be a hard-coded prompt that was determined to perform best by the LLM fine grain model 506. Alternatively, the prompt generator may be a language model trained to generate a prompt for the LLM based on the content, structure, or other features of the input question 102. An example fine-grain prompt is shown below:

Fine-Grain Prompt

Paragraphs: {Selected Paragraphs}
Question: {Question}
Find paragraph ids that contains relevant information for answering the question. Respond with comma-separated id list. Provide an empty response if none of the paragraphs are relevant.

The relevant paragraphs 508 and a prompt generated by DQA prompt generator 512 are provided to DQA model 116. The DQA prompt generator 512 can include the relevant paragraphs 508 text. An example DQA prompt is shown below:

DOA Prompt

Text: {concatenated relevant paragraph text}
Using the Text as the context, provide a very short answer to the text following
\"Question\". Answer only \"Unanswerable\" when not enough information is provided in the documents. If the question is Boolean, respond only with \"yes\" or \"no\"

The output of the DQA model 116 is answer 120. As discussed, answer 120 may be returned to the user, system, or other entity that provided the question.

Figure 6:
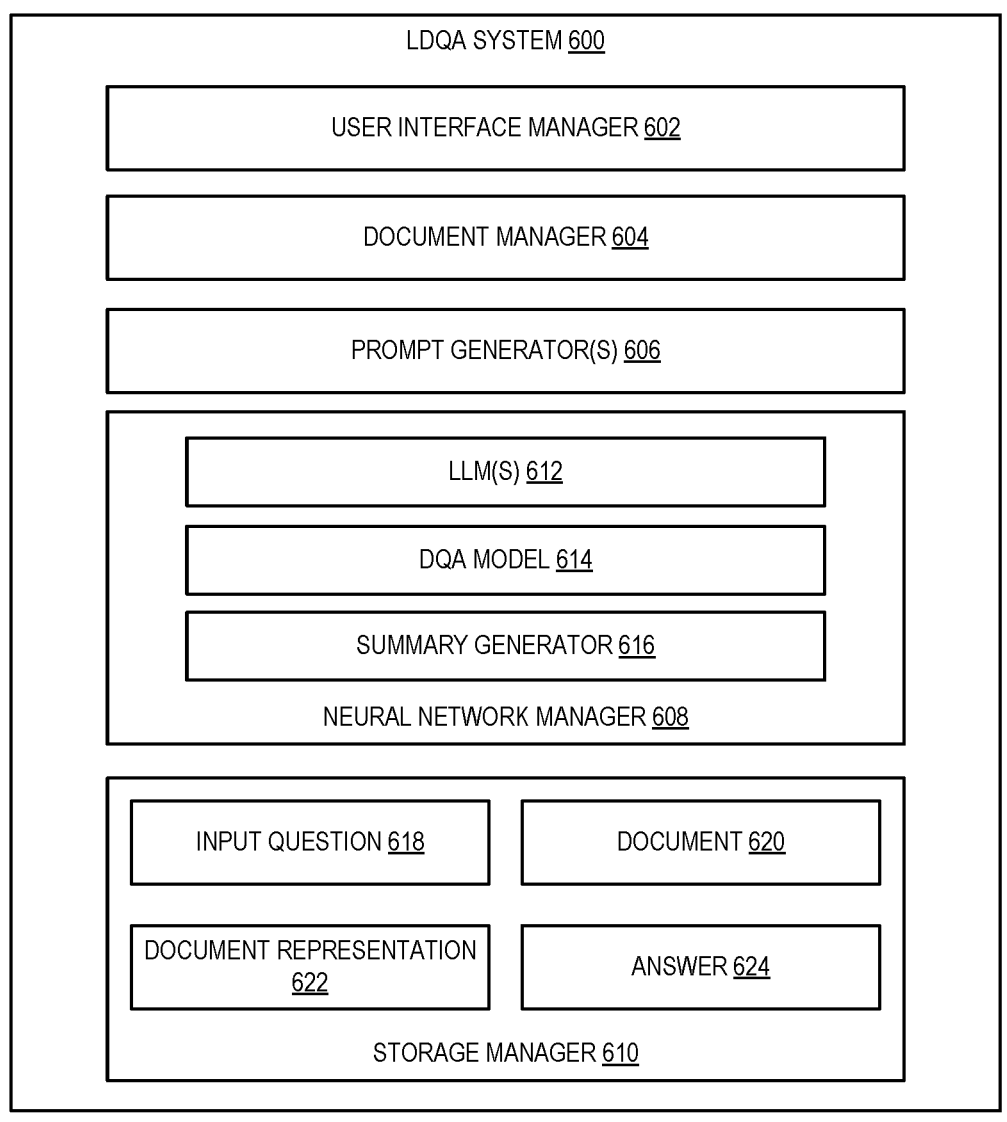
FIG. 6 illustrates a schematic diagram of a long document question answering system in accordance with one or more embodiments.

FIG. 6 illustrates a schematic diagram of a long document question answering system (e.g., "LDQA system" described above) in accordance with one or more embodiments. As shown, the LDQA system 600 may include, but is not limited to, user interface manager 602, document manager 604, prompt generator(s) 606, neural network manager 608, and storage manager 610. The neural network manager 608 includes LLM 612, DQA model 614, and summary generator 616. The storage manager 610 includes input question 618, input document 620, document representation 622, and answer 624.

As illustrated in FIG. 6, the LDQA system 600 includes a user interface manager 602. For example, the user interface manager 602 allows users to provide an input question 618 related to an input document 620 to the LDQA system 600. In some embodiments, the user interface manager 602 enables the user to view one or more documents. For example, the user may open a text or multimedia document using the user interface manager 602. The user interface provided by the user interface manager 602 may include an icon or other user interface element corresponding to the LDQA system 600. When the user selects the user interface element, the user interface manager 602 provides a user interface through which the user can enter the question to be answered. The LDQA system 600 can then process the question and the document to generate an answer to the question, as discussed above.

As illustrated in FIG. 6, the LDQA system 600 includes a document manager 604. In some embodiments, the document manager 604 is responsible for updating the content of the document to be processed by the LDQA system. For example, the document manager 604 can identify section names from the document for use in generating the document representation. In some embodiments, the document manager 604 can also add paragraph identifiers, such as paragraph numbers or other labels, to the document. This allows the document manager to map from the document representation to the document during processing by the LDQA system. For example, when relevant paragraphs are identified by the LLM, they may be identified by paragraph identifier. The document manager 604 can then retrieve the corresponding text from the document using the paragraph identifiers.

As illustrated in FIG. 6, the LDQA system 600 also includes prompt generator(s) 606. The prompt generator(s) 606 are responsible for generating prompts to instruct the LLM(s) to process the document representation and/or relevant sections. As discussed above, the prompt generators may generate hard-coded prompts using the input question. Alternatively, the prompt generators may include one or more machine learning models trained to generate prompts based on the features of the input question.

As illustrated in FIG. 6, the LDQA system 600 also includes a neural network manager 608. Neural network manager 608 may host a plurality of neural networks or other machine learning models, such as LLM(s) 612, DQA model 614, and summary generator 616. The neural network manager 608 may include an execution environment, libraries, and/or any other data needed to execute the machine learning models. In some embodiments, the neural network manager 608 may be associated with dedicated software and/or hardware resources to execute the machine learning models. As discussed, LLM(s) 612 can be implemented as any type of LLM. The LLM(s) can include a fine-grain LLM and a coarse-grain LLM. As discussed above, the LLMs may be used to identify the relevant portions of the document such that only relevant text is provided to the DQA model 614. This allows the DQA model 614 to generate an answer 624 with state-of-the-art accuracy, while processing significantly less text from the document than existing LDQA techniques. In some embodiments, the neural network manager 608 also includes a summary generator 616. As discussed, the summary generator may a include neural network trained to generate a summary of an input text. This allows for the document representation to be generated using the summary.

Although depicted in FIG. 6 as being hosted by a single neural network manager 608, in various embodiments the neural networks may be hosted in multiple neural network managers and/or as part of different components. For example, each network can be hosted by their own neural network manager, or other host environment, in which the respective neural networks execute, or the networks may be spread across multiple neural network managers depending on, e.g., the resource requirements of each network, etc.

As illustrated in FIG. 6, the LDQA system 600 also includes the storage manager 610. The storage manager 610 maintains data for the LDQA system 600. The storage manager 610 can maintain data of any type, size, or kind as necessary to perform the functions of the LDQA system 600. The storage manager 610, as shown in FIG. 6, includes the input question 618. The input question 618 can include a natural language question received from a user, or other entity, as discussed in additional detail above. In particular, in one or more embodiments, the input question 618 includes a question related to a document 620 to be answered by the LDQA system 600.

As further illustrated in FIG. 6, the storage manager 610 also includes document 620. Document 620 can include any document that includes text content. The document 620 can be stored locally or remotely. The storage manager 610 may also include document representation 622. The document representation 622 may include a summary of the document 620. As discussed, it may include section headings and section summaries. In some embodiments, the headings are extracted from the document 620 and the section summaries are generated by the summary generator 616. Alternatively, the document representation may be provided by the user with the question and the document. The storage manager 610 may further include answer 624. The answer 624 is a natural language text answer generated by DQA model 614, as discussed above. The answer 624 may be returned to the user via the user interface manager 602, as discussed above.

Each of the components 602-610 of the LDQA system 600 and their corresponding elements (as shown in FIG. 6) may be in communication with one another using any suitable communication technologies. It will be recognized that although components 602-610 and their corresponding elements are shown to be separate in FIG. 6, any of components 602-610 and their corresponding elements may be combined into fewer components, such as into a single facility or module, divided into more components, or configured into different components as may serve a particular embodiment.

The components 602-610 and their corresponding elements can comprise software, hardware, or both. For example, the components 602-610 and their corresponding elements can comprise one or more instructions stored on a computer-readable storage medium and executable by processors of one or more computing devices. When executed by the one or more processors, the computer-executable instructions of the LDQA system 600 can cause a client device and/or a server device to perform the methods described herein. Alternatively, the components 602-610 and their corresponding elements can comprise hardware, such as a special purpose processing device to perform a certain function or group of functions. Additionally, the components 602-610 and their corresponding elements can comprise a combination of computer-executable instructions and hardware.

Furthermore, the components 602-610 of the LDQA system 600 may, for example, be implemented as one or more stand-alone applications, as one or more modules of an application, as one or more plug-ins, as one or more library functions or functions that may be called by other applications, and/or as a cloud-computing model. Thus, the components 602-610 of the LDQA system 600 may be implemented as a stand-alone application, such as a desktop or mobile application. Furthermore, the components 602-610 of the LDQA system 600 may be implemented as one or more web-based applications hosted on a remote server. Alternatively, or additionally, the components of the LDQA system 600 may be implemented in a suite of mobile device applications or "apps."

As shown, the LDQA system 600 can be implemented as a single system. In other embodiments, the LDQA system 600 can be implemented in whole, or in part, across multiple systems. For example, one or more functions of the LDQA system 600 can be performed by one or more servers, and one or more functions of the LDQA system 600 can be performed by one or more client devices. The one or more servers and/or one or more client devices may generate, store, receive, and transmit any type of data used by the LDQA system 600, as described herein.

In one implementation, the one or more client devices can include or implement at least a portion of the LDQA system 600. In other implementations, the one or more servers can include or implement at least a portion of the LDQA system 600. For instance, the LDQA system 600 can include an application running on the one or more servers or a portion of the LDQA system 600 can be downloaded from the one or more servers. Additionally or alternatively, the LDQA system 600 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

FIGS. 1-6, the corresponding text, and the examples, provide a number of different systems and devices that enable long document question answering. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of long document question answering in accordance with one or more embodiments. In one or more embodiments, the method 700 is performed in a digital medium environment that includes the LDQA system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving a question for a document. As discussed, the question can be received via a user interface. For example, a user may be viewing a document and may select a user interface element associated with the LDQA system. This may cause a text box or other element to be presented through which the user may enter a natural language question.

As illustrated in FIG. 7, the method 700 also includes an act 704 of obtaining a representation of the document. In some embodiments, the representation of the document may be provided with the question or the document. Alternatively, the representation of the document may be generated based on the document. For example, section headings may be obtained from the document and a summary generator may generate a summary of the text of each section. The section headings and section summaries may then be combined to create the representation of the document. In some embodiments, the representation of the document is a summary including a plurality of section headings and section summaries generated by a summary generator model.

As illustrated in FIG. 7, the method 700 also includes an act 706 of identifying, using a large language model (LLM), one or more sections of the document that are relevant to the question using the representation of the document. As discussed, one or more LLMs may be used to identify the relevant portions of the document needed to answer the question. This allows for just the relevant text of the document to be processed by the document question answering model, rather than the entire document. Additionally, by using the representation of the document, the overall context of the document can be used by the LLM to identify relevant sections, allowing for more accurate inferences.

In some embodiments, identifying, using a large language model (LLM), one or more sections of the document that are relevant to the question using the representation of the document, further includes providing, to the LLM, the question, the representation of the document, and a prompt, wherein the prompt instructs the LLM to return a set of sections relevant to the question, and receiving, from the LLM, the set of sections relevant to the question, wherein the set of sections includes the one or more sections of the document. In some embodiments, the prompt instructs the LLM to return the set of sections by section name.

As illustrated in FIG. 7, the method 700 also includes an act 708 of determining, by a document question answering model, an answer to the question using the one or more sections of the document. As discussed, the paragraph text from the document corresponding to the one or more sections is processed by the DQA model, saving on processing resources.

In some embodiments, the number of LLM processing rounds may be determined based on the quantity of relevant text identified by the LLM. For example, in some embodiments, determining, by a document question answering model, an answer to the question using the one or more sections of the document, further includes determining a number of tokens associated with the one or more sections of the document is less than a token limit associated with the document question answering model and providing the one or more sections and the question to the document question answering model to determine the answer to the question. Alternatively, in some embodiments, determining, by a document question answering model, an answer to the question using the one or more sections of the document, further includes determining a number of tokens associated with the one or more sections of the document exceeds a token limit associated with the document question answering model, providing the one or more sections and the question to a fine-grain model to identify one or more paragraphs relevant to the question from the one or more sections, and receiving, from the fine-grain model, the one or more paragraphs.

In some embodiments, each paragraph of the document is marked with a paragraph identifier, and a prompt instructing the fine-grain model to identify relevant the one or more paragraphs relevant to the question using their paragraph identifiers is generated. In some embodiments, the one or more paragraphs and the question are provided to the document question answering model to determine the answer to the question. In some embodiments, the fine-grain model is the LLM.

In some embodiments, the method may include receiving a question for a document, generating, by a summary generator, a representation of the document, identifying, using a coarse-grain large language model (LLM), one or more relevant sections of the document to the question using the representation of the document, identifying, using a fine-grain LLM, one or more relevant paragraphs of the document that are relevant to the question based on the relevant sections, and determining, by a document question answering model, an answer to the question using document text corresponding to the one or more relevant paragraphs. In some embodiments, the coarse-grain LLM and the fine-grain LLM are a same LLM.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
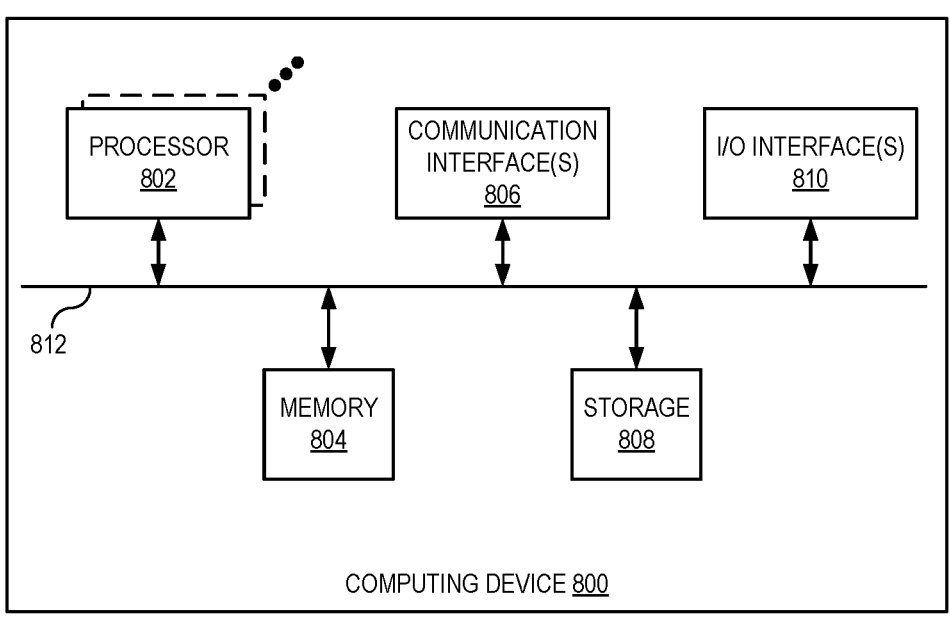
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the LDQA system. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/ interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

receiving a question for a document;

obtaining a representation of the document, the representation of the document including section headings that map to a corresponding section of the document and a corresponding content summary for each of the section headings;

identifying, using a large language model (LLM), one or more sections of the document that are relevant to the question using the representation of the document; and determining, by a document question answering model, an answer to the question using the one or more sections of the document.

2. The method of claim 1, wherein identifying, using a large language model (LLM), one or more sections of the document that are relevant to the question using the representation of the document, further comprises:

providing, to the LLM, the question, the representation of the document, and a prompt, wherein the prompt instructs the LLM to return a set of sections relevant to the question; and receiving, from the LLM, the set of sections relevant to the question, wherein the set of sections includes the one or more sections of the document.

3. The method of claim 2, wherein the prompt instructs the LLM to return the set of sections by section name.

4. The method of claim 1, wherein determining, by a document question answering model, an answer to the question using the one or more sections of the document, further comprises:

determining a number of tokens associated with the one or more sections of the document is less than a token limit associated with the document question answering model; and providing the one or more sections and the question to the document question answering model to determine the answer to the question.

5. The method of claim 1, wherein determining, by a document question answering model, an answer to the question using the one or more sections of the document, further comprises:

determining a number of tokens associated with the one or more sections of the document exceeds a token limit associated with the document question answering model;

providing the one or more sections and the question to a fine-grain model to identify one or more paragraphs relevant to the question from the one or more sections; and receiving, from the fine-grain model, the one or more paragraphs.

6. The method of claim 5, further comprising:

marking each paragraph of the document with a paragraph identifier; and generating a prompt instructing the fine-grain model to identify the one or more paragraphs relevant to the question using their paragraph identifiers.

7. The method of claim 5, further comprising:

providing the one or more paragraphs and the question to the document question answering model to determine the answer to the question.

8. The method of claim 7, wherein the fine-grain model is the LLM.

9. The method of claim 1, wherein the corresponding content summary for each of the section headings is generated by a summary generator model.

10. A non-transitory computer-readable medium storing executable instructions, which when executed by a processing device, cause the processing device to perform operations comprising:

receiving a question for a document;

obtaining a representation of the document, the representation of the document including section headings that map to a corresponding section of the document and a corresponding content summary for each of the section headings;

identifying, using a large language model (LLM), one or more sections of the document that are relevant to the question using the representation of the document; and determining, by a document question answering model, an answer to the question using the one or more sections of the document.

11. The non-transitory computer-readable medium of claim 10, wherein identifying, using a large language model (LLM), one or more sections of the document that are relevant to the question using the representation of the document, further comprises:

providing, to the LLM, the question, the representation of the document, and a prompt, wherein the prompt instructs the LLM to return a set of sections relevant to the question; and receiving, from the LLM, the set of sections relevant to the question, wherein the set of sections includes the one or more sections of the document.

12. The non-transitory computer-readable medium of claim 11, wherein the prompt instructs the LLM to return the set of sections by section name.

13. The non-transitory computer-readable medium of claim 10, wherein determining, by a document question answering model, an answer to the question using the one or more sections of the document, further comprises:

determining a number of tokens associated with the one or more sections of the document is less than a token limit associated with the document question answering model; and providing the one or more sections and the question to the document question answering model to determine the answer to the question.

14. The non-transitory computer-readable medium of claim 10, wherein determining, by a document question answering model, an answer to the question using the one or more sections of the document, further comprises:

determining a number of tokens associated with the one or more sections of the document exceeds a token limit associated with the document question answering model;

providing the one or more sections and the question to a fine-grain model to identify one or more paragraphs relevant to the question from the one or more sections; and receiving, from the fine-grain model, the one or more paragraphs.

15. The non-transitory computer-readable medium of claim 14, further comprising:

marking each paragraph of the document with a paragraph identifier; and generating a prompt instructing the fine-grain model to identify the one or more paragraphs relevant to the question using their paragraph identifiers.

16. The non-transitory computer-readable medium of claim 14, further comprising:

providing the one or more paragraphs and the question to the document question answering model to determine the answer to the question.

17. The non-transitory computer-readable medium of claim 16, wherein the fine-grain model is the LLM.

18. The non-transitory computer-readable medium of claim 10, wherein the corresponding content summary for each of the section headings is generated by a summary generator model.

19. A system comprising:

a memory component; and a processing device coupled to the memory component, the processing device to perform operations comprising:

receiving a question for a document;

generating, by a summary generator, a representation of the document, the representation of the document including section headings that map to a corresponding section of the document and a corresponding content summary for each of the section headings;

identifying, using a coarse-grain large language model (LLM), one or more relevant sections of the document to the question using the representation of the document;

identifying, using a fine-grain LLM, one or more relevant paragraphs of the document that are relevant to the question based on the one or more relevant sections; and determining, by a document question answering model, an answer to the question using document text corresponding to the one or more relevant paragraphs.

20. The system of claim 19, wherein the coarse-grain LLM and the fine-grain LLM are a same LLM.

\* \* \* \* \*